United States Patent
Verma

(10) Patent No.: US 9,477,424 B1
(45) Date of Patent: Oct. 25, 2016

(54) METHODS AND SYSTEMS FOR USING AN INTELLIGENT STORAGE ADAPTER FOR REPLICATION IN A CLUSTERED ENVIRONMENT

(71) Applicant: QLOGIC, Corporation, Aliso Viejo, CA (US)

(72) Inventor: Anurag Verma, Pune (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 216 days.

(21) Appl. No.: 14/339,086

(22) Filed: Jul. 23, 2014

(51) Int. Cl.
*G06F 12/00* (2006.01)
*G06F 3/06* (2006.01)

(52) U.S. Cl.
CPC ............... *G06F 3/065* (2013.01); *G06F 3/067* (2013.01); *G06F 3/0619* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 5,689,678 A | 11/1997 | Stallmo et al. | |
| 6,219,676 B1 | 4/2001 | Reiner | |
| 6,467,022 B1 | 10/2002 | Buckland et al. | |
| 6,484,229 B1 | 11/2002 | Ichikawa et al. | |
| 6,502,205 B1 * | 12/2002 | Yanai | G06F 3/0601 714/6.32 |
| 6,745,324 B1 | 6/2004 | Skazinski et al. | |
| 6,799,283 B1 | 9/2004 | Tamai et al. | |
| 6,922,754 B2 | 7/2005 | Liu et al. | |
| 7,013,336 B1 | 3/2006 | King | |
| 7,249,221 B2 | 7/2007 | Shimada | |
| 7,272,674 B1 | 9/2007 | Nandi et al. | |
| 7,356,573 B2 | 4/2008 | Sharma et al. | |
| 7,506,124 B2 | 3/2009 | Sharma et al. | |
| 7,617,289 B2 | 11/2009 | Srinivasan et al. | |
| 7,631,155 B1 | 12/2009 | Bono et al. | |
| 7,685,269 B1 | 3/2010 | Thrasher et al. | |
| 7,865,663 B1 | 1/2011 | Nelson et al. | |
| 7,873,619 B1 | 1/2011 | Faibish et al. | |
| 8,099,499 B2 | 1/2012 | Oeda | |
| 8,510,265 B1 | 8/2013 | Boone et al. | |
| 8,555,022 B1 | 10/2013 | Edwards et al. | |
| 8,589,550 B1 | 11/2013 | Faibish et al. | |
| 8,626,967 B1 | 1/2014 | Naik et al. | |
| 8,639,872 B1 | 1/2014 | Boyle et al. | |
| 8,805,951 B1 | 8/2014 | Faibish et al. | |
| 8,863,145 B2 | 10/2014 | Watanabe et al. | |
| 9,009,444 B1 | 4/2015 | Derbeko et al. | |

(Continued)

OTHER PUBLICATIONS

"International Search Report on corresponding PCT application (PCT/US2013/042918) from International Searching Authority (USPTO) dated Nov. 27, 2013".

(Continued)

*Primary Examiner* — Prasith Thammavong
*Assistant Examiner* — Jason Blust
(74) *Attorney, Agent, or Firm* — Klein, O'Neill & Singh, LLP

(57) ABSTRACT

Methods and systems for synchronous replication of data are provided. A master intelligent storage adapter operating within a cluster having a slave intelligent storage adapter receives a plurality of write requests; generates a first input/output (I/O) request for storing the data for the plurality of write requests at a first storage device; and generates a second I/O request for a replication module executed by a computing device for synchronously storing the data at a second storage device. The computing device initiates a synchronous replication operation to replicate the data for the plurality of write requests at the second storage device.

21 Claims, 7 Drawing Sheets

(56) References Cited

U.S. PATENT DOCUMENTS

| | | | |
|---|---|---|---|
| 9,172,586 | B1 | 10/2015 | Shah et al. |
| 9,232,005 | B1 | 1/2016 | Shah et al. |
| 2003/0135782 | A1 | 7/2003 | Matsunami et al. |
| 2003/0140209 | A1 | 7/2003 | Testardi |
| 2003/0172149 | A1 | 9/2003 | Edsall et al. |
| 2005/0027798 | A1 | 2/2005 | Chiou et al. |
| 2005/0210314 | A1 | 9/2005 | Iguchi |
| 2006/0031653 | A1 | 2/2006 | Todd et al. |
| 2006/0075190 | A1 | 4/2006 | Higaki et al. |
| 2006/0095709 | A1 | 5/2006 | Achiwa |
| 2006/0218362 | A1 | 9/2006 | McManis |
| 2006/0282618 | A1 | 12/2006 | Thompson et al. |
| 2007/0016681 | A1 | 1/2007 | Suzuki et al. |
| 2007/0028073 | A1 | 2/2007 | Takayama et al. |
| 2008/0071984 | A1 | 3/2008 | Araki et al. |
| 2008/0104259 | A1 | 5/2008 | LeFevre et al. |
| 2008/0114961 | A1 | 5/2008 | Ramaswamy et al. |
| 2008/0270700 | A1 | 10/2008 | Rao et al. |
| 2008/0270727 | A1 | 10/2008 | Jacobson et al. |
| 2009/0055507 | A1 | 2/2009 | Oeda |
| 2009/0064161 | A1 | 3/2009 | Hosouchi et al. |
| 2009/0187713 | A1 | 7/2009 | Zedlewski et al. |
| 2009/0210620 | A1 | 8/2009 | Jibbe et al. |
| 2009/0248975 | A1 | 10/2009 | Daud et al. |
| 2009/0265507 | A1 | 10/2009 | Jibbe et al. |
| 2010/0281230 | A1 | 11/2010 | Rabii et al. |
| 2011/0087833 | A1 | 4/2011 | Jones |
| 2011/0138136 | A1 | 6/2011 | Shitomi et al. |
| 2011/0161557 | A1 | 6/2011 | Haines et al. |
| 2011/0191534 | A1 | 8/2011 | Ash et al. |
| 2011/0197046 | A1 | 8/2011 | Chiu et al. |
| 2011/0238672 | A1 | 9/2011 | Agarwala et al. |
| 2011/0276746 | A1 | 11/2011 | Pruthi et al. |
| 2011/0289279 | A1 | 11/2011 | Sonnier et al. |
| 2012/0005668 | A1 | 1/2012 | Serizawa et al. |
| 2012/0089786 | A1 | 4/2012 | Pruthi |
| 2012/0102137 | A1 | 4/2012 | Pruthi et al. |
| 2012/0137059 | A1 | 5/2012 | Yang et al. |
| 2012/0159053 | A1 | 6/2012 | Kano et al. |
| 2012/0221729 | A1 | 8/2012 | Hara et al. |
| 2012/0254504 | A1 | 10/2012 | Syu et al. |
| 2012/0254509 | A1 | 10/2012 | Cleveland et al. |
| 2012/0331222 | A1 | 12/2012 | Jibbe et al. |
| 2013/0042048 | A1 | 2/2013 | Kutergin et al. |
| 2013/0080715 | A1 | 3/2013 | Mori et al. |
| 2013/0111474 | A1 | 5/2013 | Agarwal et al. |
| 2013/0132673 | A1 | 5/2013 | Saito et al. |
| 2013/0198457 | A1 | 8/2013 | Kobayashi et al. |
| 2013/0198459 | A1 | 8/2013 | Joshi |
| 2013/0238851 | A1 | 9/2013 | Chang et al. |
| 2013/0282982 | A1 | 10/2013 | Hayashi |
| 2013/0290571 | A1 | 10/2013 | Rizzo et al. |
| 2013/0332612 | A1 | 12/2013 | Cai et al. |
| 2013/0339600 | A1 | 12/2013 | Shah |
| 2014/0013027 | A1 | 1/2014 | Jannyavula Venkata et al. |
| 2014/0122778 | A1 | 5/2014 | O'Brien |
| 2014/0129521 | A1 | 5/2014 | Marsden |
| 2014/0244935 | A1 | 8/2014 | Ezra et al. |
| 2014/0258533 | A1 | 9/2014 | Antony |
| 2015/0058547 | A1 | 2/2015 | Thatcher et al. |
| 2015/0134920 | A1 | 5/2015 | Anderson et al. |
| 2015/0143023 | A1 | 5/2015 | Rostoker et al. |

OTHER PUBLICATIONS

"Written Opinion on corresponding PCT application (PCT/US2013/042918) from International Searching Authority (USPTO) dated Nov. 27, 2013".

"Office Action from USPTO dated Dec. 24, 2014 for U.S. Appl. No. 13/790,395".

"International Preliminary Report on Patentability on corresponding PCT application (PCT/US2013/042918) from International Bureau (WIPO) dated Dec. 16, 2014".

"Office Action from USPTO dated Feb. 20, 2015 for U.S. Appl. No. 13/790,894".

"Office Action from USPTO dated Feb. 24, 2015 for U.S. Appl. No. 13/902,427".

"Office Action from USPTO dated Mar. 3, 2015 for U.S. Appl. No. 13/790,800".

"Office Action from USPTO dated Mar. 11, 2015 for U.S. Appl. No. 13/790,846".

"Office Action from USPTO dated Mar. 27, 2015 for U.S. Appl. No. 13/790,471".

"Office Action from USPTO dated May 7, 2015 for U.S. Appl. No. 13/790,499".

"QLOGIC 10000 Series QLogic FabricCache Adapter Data Sheet", (Nov. 2013).

"Notice of Allowance from USPTO dated Aug. 14, 2015 for U.S. Appl. No. 13/790,846".

"Final Office Action from USPTO dated Aug. 18, 2015 for U.S. Appl. No. 13/790,395".

"VMWare Storage Best Practices", *VMWare*, (Apr. 2011),https://www.vmware.com/files/pdf/support/landing_pages/Virtual-Support-Day-Storage-Best-Practices-June-2012.pdf.

"Notice of Allowance from USPTO dated Aug. 26, 2015 for U.S. Appl. No. 13/902,427".

"Notice of Allowance from USPTO dated Sep. 23, 2015 for U.S. Appl. No. 14/088,082".

"Final Office Action from USPTO dated Sep. 24, 2015 for U.S. Appl. No. 13/790,800".

"Final Office Action from USPTO dated Oct. 8, 2015 for U.S. Appl. No. 13/790,471".

"Final Office Action from USPTO dated Sep. 15, 2015 for U.S. Appl. No. 13/790,894".

"Office Action from USPTO dated Oct. 19, 2015 for U.S. Appl. No. 14/165,100".

"Final Office Action from USPTO dated Oct. 23, 2015 for U.S. Appl. No. 13/790,499".

"Office Action from USPTO dated Dec. 4, 2015 for U.S. Appl. No. 14/193,691".

"Notice of Allowance from USPTO dated Nov. 25, 2015 for U.S. Appl. No. 13/790,846".

"Office Action from USPTO dated Dec. 21, 2015 for U.S. Appl. No. 14/302,706".

"Notice of Allowance from USPTO dated Jan. 15, 2016 for U.S. Appl. No. 13/790,395".

"Extended European Search Report from EPO dated Jan. 28, 2016 for EP Application No. 13803862.5".

"Notice of Allowance from USPTO dated Jan. 29, 2016 for U.S. Appl. No. 14/470,309".

"Office Action from USPTO dated Feb. 26, 2016 for U.S. Appl. No. 13/790,499".

"Notice of Allowance from USPTO dated Mar. 1, 2016 for U.S. Appl. No. 13/790,471".

"Notice of Allowance from USPTO dated Mar. 1, 2016 for U.S. Appl. No. 14/470,337".

"Office Action from USPTO dated Mar. 2, 2016 for U.S. Appl. No. 14/593,898".

"Office Action from USPTO dated Mar. 9, 2016 for U.S. Appl. No. 14/312,130".

"Notice of Allowance from USPTO dated Mar. 30, 2016 for U.S. Appl. No. 13/790,471".

"Notice of Allowance from USPTO dated Apr. 11, 2016 for U.S. Appl. No. 13/790,395".

"Final Office Action from USPTO dated Apr. 21, 2016 for U.S. Appl. No. 14/165,100".

"Notice of Allowance from USPTO dated Apr. 26, 2016 for U.S. Appl. No. 14/498,580".

"Notice of Allowance from USPTO dated May 27, 2016 for U.S. Appl. No. 14/302,706".

"Office Action from USPTO dated Jun. 6, 2016 for U.S. Appl. No. 13/790,894".

"Office Action from USPTO dated Jun. 6, 2016 for U.S. Appl. No. 13/790,800".

"Final Office Action from USPTO dated Jun. 13, 2016 for U.S. Appl. No. 14/193,691".

(56) References Cited

OTHER PUBLICATIONS

"Notice of Allowance from USPTO dated Jul. 5, 2016 for U.S. Appl. No. 14/302,706".

"Notice of Allowance from USPTO dated Jul. 21, 2016 for U.S. Appl. No. 14/312,130".

Notice of Allowance from USPTO dated Jul. 28, 2016 for U.S. Appl. No. 14/165,100.

Notice of Allowance from USPTO dated Aug. 15, 2016 for U.S. Appl. No. 14/498,580.

* cited by examiner

METHODS AND SYSTEMS FOR USING AN INTELLIGENT STORAGE ADAPTER FOR REPLICATION IN A CLUSTERED ENVIRONMENT

TECHNICAL FIELD

The present disclosure relates to storage systems and more particularly, for using intelligent storage adapters for replication in a clustered environment.

BACKGROUND

A computer network, often simply referred to as a network, is a group of interconnected computers and devices that facilitates communication among users and allows users to share resources. Adapters, switches and other devices are typically used during network communication for reading and writing data at mass storage devices.

Computing devices (or systems) use mass storage devices to store data. Data centers are commonly used to store large amount of data for computing devices. Different storage options are available for computing devices to store data and retrieve data. For example, direct-attached storage (DAS), network attached storage (NAS) and storage area networks (SANs).

A DAS system typically includes a plurality of storage drives that are directly attached to a computing device (for example, a server) and is accessible via a host bus adapter (HBA). Common protocols used for DAS storage devices are SCSI (Small Computer Systems Interface), ATA (AT attachment), SATA (Serial ATA), SAS (Serial Attached SCSI) and others.

NAS is a file level storage that provides access to a plurality of computing devices. NAS typically uses network file sharing protocols, for example, NFS (Networked File System), CIFS (Common Internet File System) and others for storing and managing data at storage devices.

SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often utilize a Fibre Channel fabric topology, an infrastructure specially designed to handle storage communications. SANs may also use iSCSI (i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet) and other protocols for storing data at storage devices.

Typically, information stored at mass storage devices is replicated from a primary site to a disaster recovery site. The replication process can be inefficient when multiple applications issue read and write requests. Continuous efforts are being made to improve replication services.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
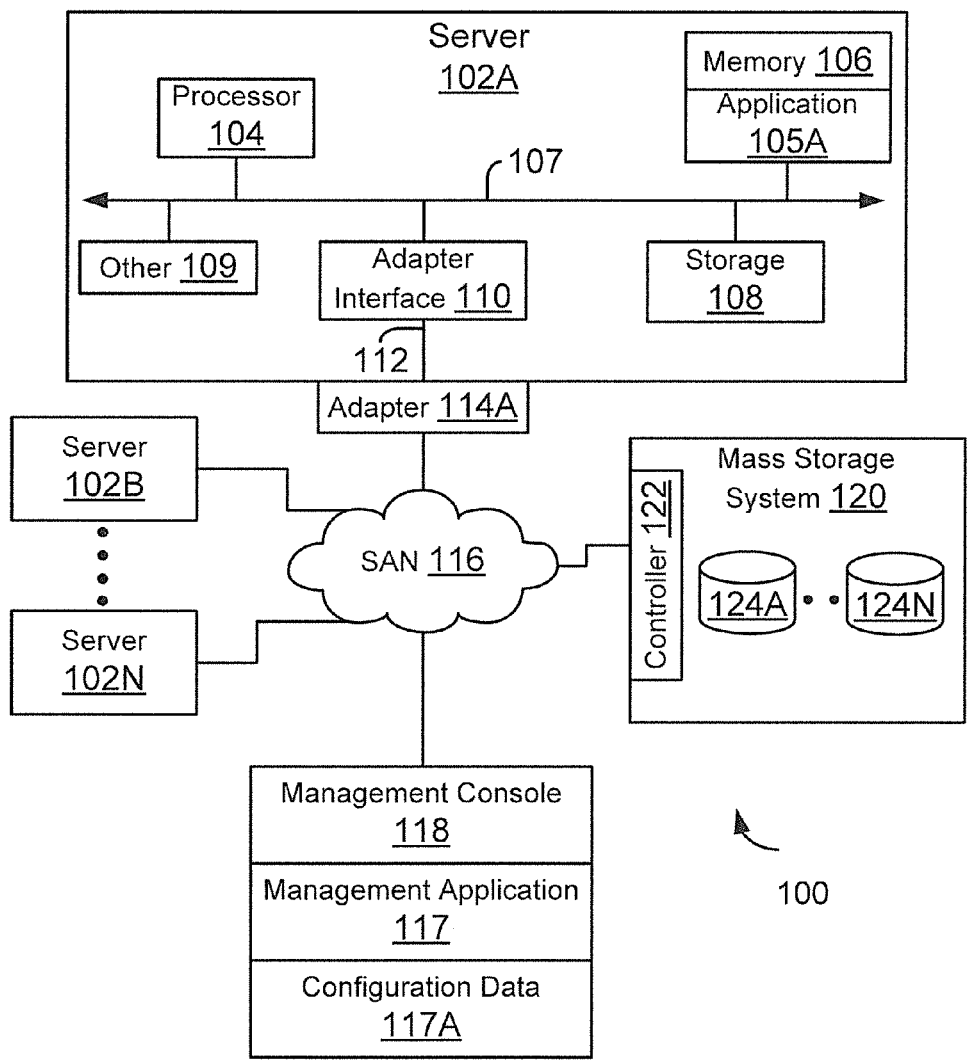
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer" "system," and "functionality" represent executable instructions that perform specified tasks when executed on a hardware based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one embodiment, an intelligent storage adapter (ISA), for example, a network device is provided. The ISA includes a storage protocol controller having a port for interfacing with a storage area network (SAN) based storage device and another ISA operating within a cluster is provided. The ISA includes a processor executing instructions for managing a local storage device that is configured to operate as a caching device for a computing device. The ISA operates as a host bus adapter and a storage controller for managing storage space at the local storage device and the SAN-based storage device.

In another embodiment, a synchronous replication process is provided. A master ISA operates in a cluster and receives input/output (I/O) requests from a plurality of applications to read and write data. The master ISA then prepares I/O requests for storing the data at a SAN based storage device and sends I/O requests to an agent at a computing device. The agent provides details for replicating the data to a replication module that issues I/O requests for a disaster recovery site. Details regarding the various processes and systems for synchronous replication are provided below.

System 100:

FIG. 1A is a block diagram of a system 100 configured for use with the present embodiments. System 100 may include a plurality of computing systems 102A-102N (which may also be referred to as server(s) 102 or host system(s) 102), each coupled to an adapter, as illustrated herein by server 102A and adapter 114A (also referred to as an ISA 114A) that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture bus, a SCSI bus, a universal serial bus (USB), an Institute of Electrical and Electronics Engineers (IEEE) standard 1394 bus (sometimes referred to as "Firewire"), or any other type of bus.

The computing system 102A may further include a storage device 108, which may be for example a hard disk (HDD), a solid-state drive (SSD), a hybrid drive (sometimes referred to as SSHD), a CD, DVD, or Blu-Ray drive, a non-volatile memory device (flash or memory stick) or any other storage device for storing structured or unstructured data. Storage 108 may store operating system program files (or data containers) and/or application program files, for example, email applications, database applications, management applications, and other application files. Some of these files are stored on storage 108 using an installation program. For example, the processor 104 may execute computer-executable process steps of an installation program so that the processor 14 can properly execute the application program.

In one embodiment, storage device 108 may be a SSD. SSDs are becoming popular for servers that may need to store large amounts of data with relatively quick access. ISA 114A described below in more detail may be used to manage and/or access storage device 108, according to one embodiment.

Memory 106 also interfaces with the computer bus 107 to provide the processor 104 with access to memory storage.

Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In an embodiment, processor 104 may execute an application 105A for performing certain functions. For example, application 105A may be a database application, a virtual machine executed in a virtual environment (provided by VMware Corporation, Microsoft Corporation or any other entity), an electronic email application (for example, Microsoft Exchange), or any other application type. Application 105A may issue read and write requests that are processed by ISA 114A, as described below in more detail. Application 105A may also be referred to as a "client."

The computing system 102A also includes other devices and interfaces 109, which may include a display device interface, a keyboard interface, a pointing device interface and others. The details of these components are not germane to the inventive embodiments.

ISA 114A may be configured to handle both network and storage traffic while interfacing with other elements. In one embodiment, as described below in detail, ISA 114A may be configured to provide the functionality of a host bus adapter (HBA) by providing connectivity to SAN-based storage arrays, as well as, present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates that are greater than 1 gigabit (GB). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel (or FC) is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol. In one embodiment, ISA 114A can be configured to operate as a FCOE adapter. Those of ordinary skill in the art will appreciate, however, that the present embodiments are not limited to any particular protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, ISA 114A may operate as an initiator as well as a target for responding to input/output (I/O or IO) requests for reading and writing information at storage devices.

Storage space at a storage device (local or SAN-based) is typically presented to application 105A as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105A to read and write data to storage locations. The LBAs are mapped with actual physical storage to read and write data. A LUN used by an application may be referred to as a data LUN. A LUN that is accessible via a SAN connection may be referred to as a SAN LUN. A LUN at a local storage device managed by ISA 114A may be referred to as "cache" LUN. A cache LUN may be used to cache data stored at a SAN LUN or another data LUN. The cache LUN is managed by ISA 114A and may not be visible to application 105A.

Referring back to FIG. 1A, computing system 102 uses an adapter interface 110 to communicate with ISA 114A via a link 112. In one embodiment, link 112 may be a PCI-Express link or any other interconnect type. The adaptive embodiments disclosed herein are not limited to any particular link type.

ISA 114A may communicate and interface with a mass storage system 120 via a SAN 116 that may include one or more switch(es) (which also may be referred to as fabric switches). The mass storage system 120 may include a plurality of storage devices 124A-124N. Storage space at storage devices 124A-124N may be presented as SAN LUNs to application 105A via SAN 116. Controller 122 of mass storage system 120 may be used to manage storage devices 124A-124N. In one embodiment, controller 122 may include a processor, an ISA 114A and other similar components.

System 100 may also include a management console 118, used according to one embodiment. Management console 118 may be a computer system similar to computing system 102A described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure 117A at a storage location.

In one embodiment, ISA 114A is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114A may configure a LUN from the local storage 108 and present the LUN to servers 102A-102N, allowing the local storage 108 to be shared by other Servers 102B-102N.

In another embodiment, ISA 114A provides traditional SAN connectivity to computing systems 102A and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local SSDs for read and/or write caching.

Figure 1B:
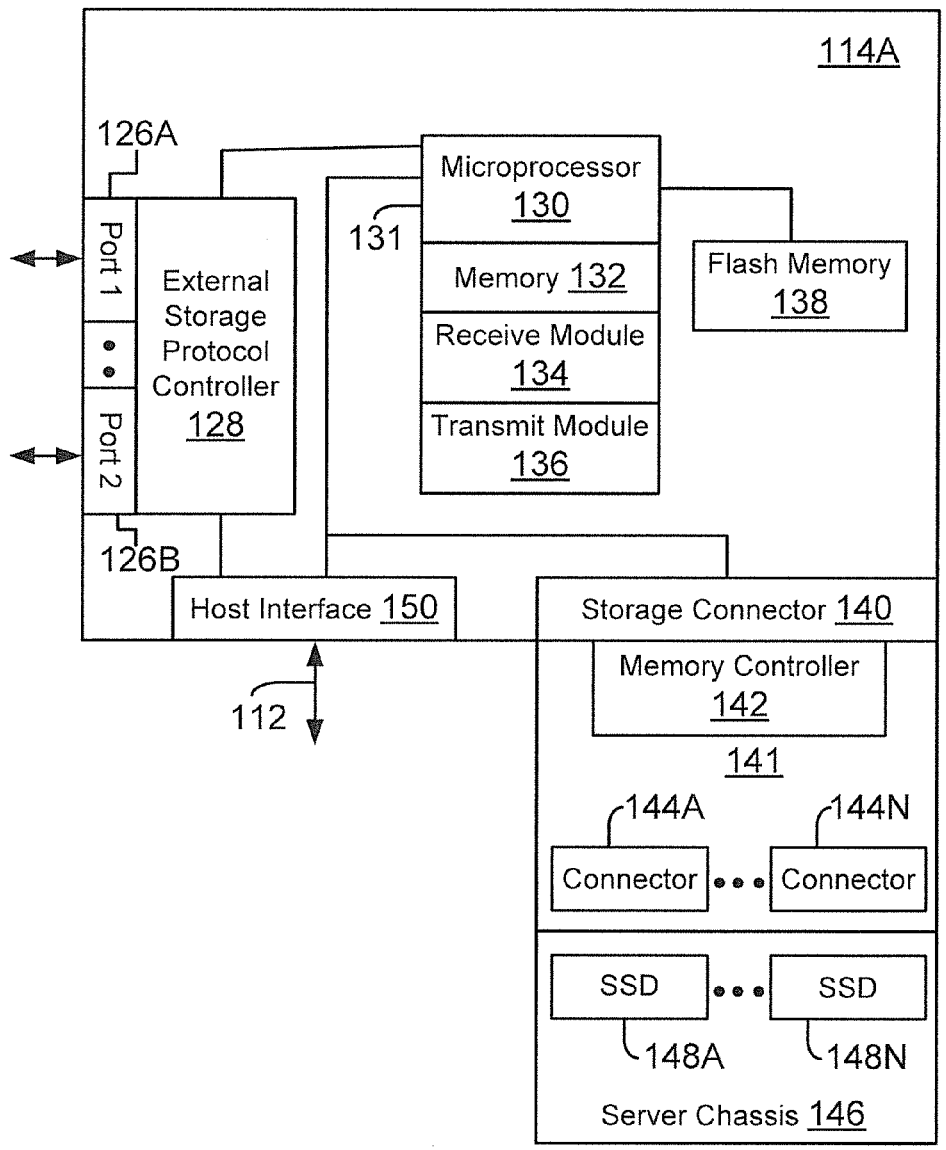
FIG. 1B shows an example of an intelligent storage adapter (ISA)

FIG. 1B shows an example of ISA 114A that includes a storage protocol controller 128 (shown as "external storage protocol controller") with ports 126A and 126B. The storage protocol controller may be a Fibre Channel controller (or application specific integrated circuit (ASIC)) used for interfacing with Fibre Channel based storage devices via ports 126A/126B. In such an embodiment, ports 126A/126B include logic and circuitry for sending and receiving Fibre Channel frames. Fibre Channel is simply shown as an example and the various embodiments disclosed herein are not limited to any particular storage/network protocol. Thus ports 126A-126B are not limited to just Fibre Channel ports. Furthermore, although only two ports 126A and 126B are shown as an example, the adaptive embodiments disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one embodiment, storage protocol controller 128 includes a processor (not shown) for executing the Fibre Channel stack having layers, FC0-FC4. FC0 is defined by the Fibre Channel specification as the physical layer, which includes cables (fiber optics, twisted-pair), connectors and others. The FC1 layer is defined as the data link layer. This layer implements the 8B/10B encoding and decoding of signals. The FC2 layer is defined as the network layer. This layer defines the main Fibre Channel framing, addressing, and control protocols. The FC3 layer is an auxiliary layer that provides common services like encryption or RAID related. The FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 will depend on the type of connection/interconnect used to communicate with processor 104. For example, if a PCI-Express link is used to communicate with processor 104, then host interface 150 includes logic and circuitry for receiving and sending PCI-Express packets/information.

ISA 114A further includes a system-on-chip (SOC) 131 that includes a processor 130 having access to an adapter memory (which may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various embodiments described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by processor 130 for executing the instructions described below in detail. ISA 114A also includes a storage connector 140 that interfaces with another card 141 (may also be referred to as a daughter card 141), according to one embodiment. In one embodiment, the storage connector may be a PCI-Express connector, PCI connector or any other connector type based on the interconnect used by SOC 131 to interface with the SSDs. The daughter card 141 includes a memory controller 142 that interfaces with a plurality of connectors' 144A-144N. The plurality of connectors' 144A-144N are used to plug in, for example, SSDs 148A-148N (similar to storage 108). In this embodiment, SSDs 148A-148N are included within a server chassis 146. In one embodiment, connectors' 144A-144N may be SATA connectors for receiving SSDs 148A-148N. In another embodiment, connectors' 144A-144N may be SAS connectors. In other embodiments, any or all of the SSDs 148 may be replaced with other storage options as described herein with reference to storage 108.

ISA 114A has SAN connectivity because of ports 126A-126B, similar to a host bus adapter, as mentioned above. The storage protocol controller 128 allows SAN storage-based processing. Unlike conventional HBAs, ISA 114A also includes a storage connector 140 that provides local storage solutions via SSDs 148A-148N.

In another embodiment, ISA 114A is configured such that a daughter card has the SSDs 148A-148N on the card itself, rather than on the server chassis 146. In another embodiment, ISA 114A is configured such that the memory controller 142 is on the same card as the other components of ISA 114A. The SSDs 148A-148N are also on the same card connected via one or more storage connectors.

Figure 1C:
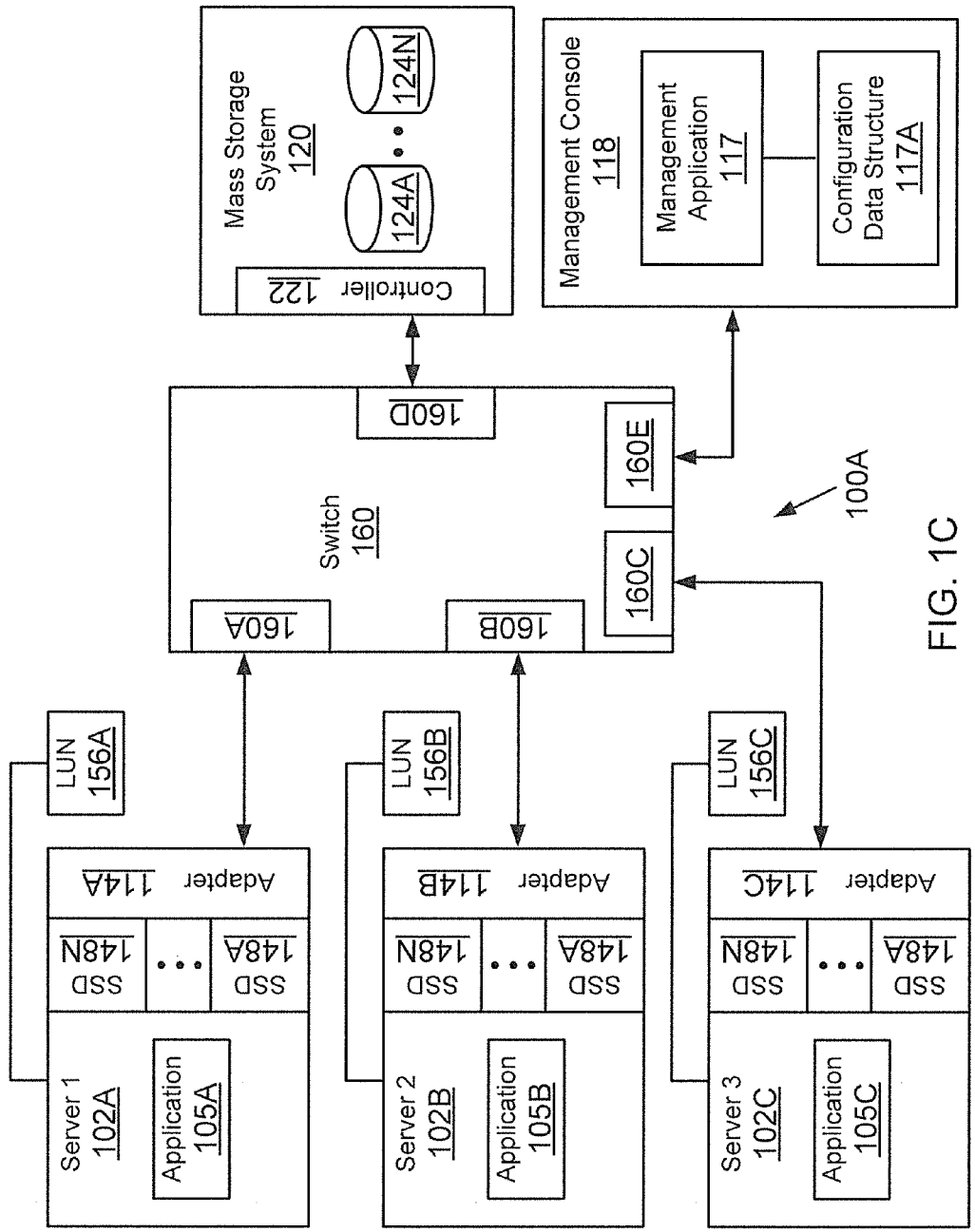
FIG. 1C shows an example of a configuration for using the ISAs, according to one embodiment.

FIG. 1C shows a system 100A where each ISA 114A-114C in servers' 102A-102C are coupled to a fabric switch 160, according to one embodiment. ISA 114B and 114C are similar to ISA 114A described above. Fabric switch 160 that is a part of SAN 116 (shown in FIG. 1A) includes a plurality of ports 160A-160E. Ports 160A-160C are coupled to ISA 114A-114C ports, respectively, while port 160D is coupled to controller 122 of the mass storage system 120. Management console 118 may be coupled to port 160E for configuring various components of system 100A.

Management console 118 may be used to configure LUNs 156A-156C that are presented to application 105A executed by server 102A, application 105B executed by server 102B, and application 105C executed by server 102C for storing information. The LUNs may be based on storage located at SAN-based storage 120 or at a local SSD 148A-148N. In one embodiment, one or more SAN LUNs are associated with an independent Data LUN. The SAN LUNs are used to read-write information. The information that is written to the SAN LUNs is also replicated at the Data LUN and then used by an application for "off-host" processing, as described below in detail.

The LUNs 156A-156C may also be configured to operate as a local LUN. In this configuration, the LUN may be used as a "boot" LUN. The LUN may be used by the host computing system to which it is presented. One or more ISAs may present the boot LUN to any of the servers that are served by a cluster of ISAs.

The LUNs 156A-156C may also be accessible by one or more servers via switch 160. In this example, a DAS-based SSD becomes accessible as SAN storage, while the DAS-based storage is still managed by an application 105A (for example, a database application).

In one embodiment, ISAs 114A-114C operate within a cluster. The cluster is configured using management application 117. The cluster is identified by a unique identifier. Within the cluster, a specific ISA may operate as a LUN owner or a "cache owner." The cache owner adapter interfaces with the SAN LUN for executing read and write operations. As an example, adapter 114A may be the cache owner for LUN 156A that is presented to application 105B. In this configuration, ISA 114B becomes the client ISA or the client adapter.

Figure 1D:
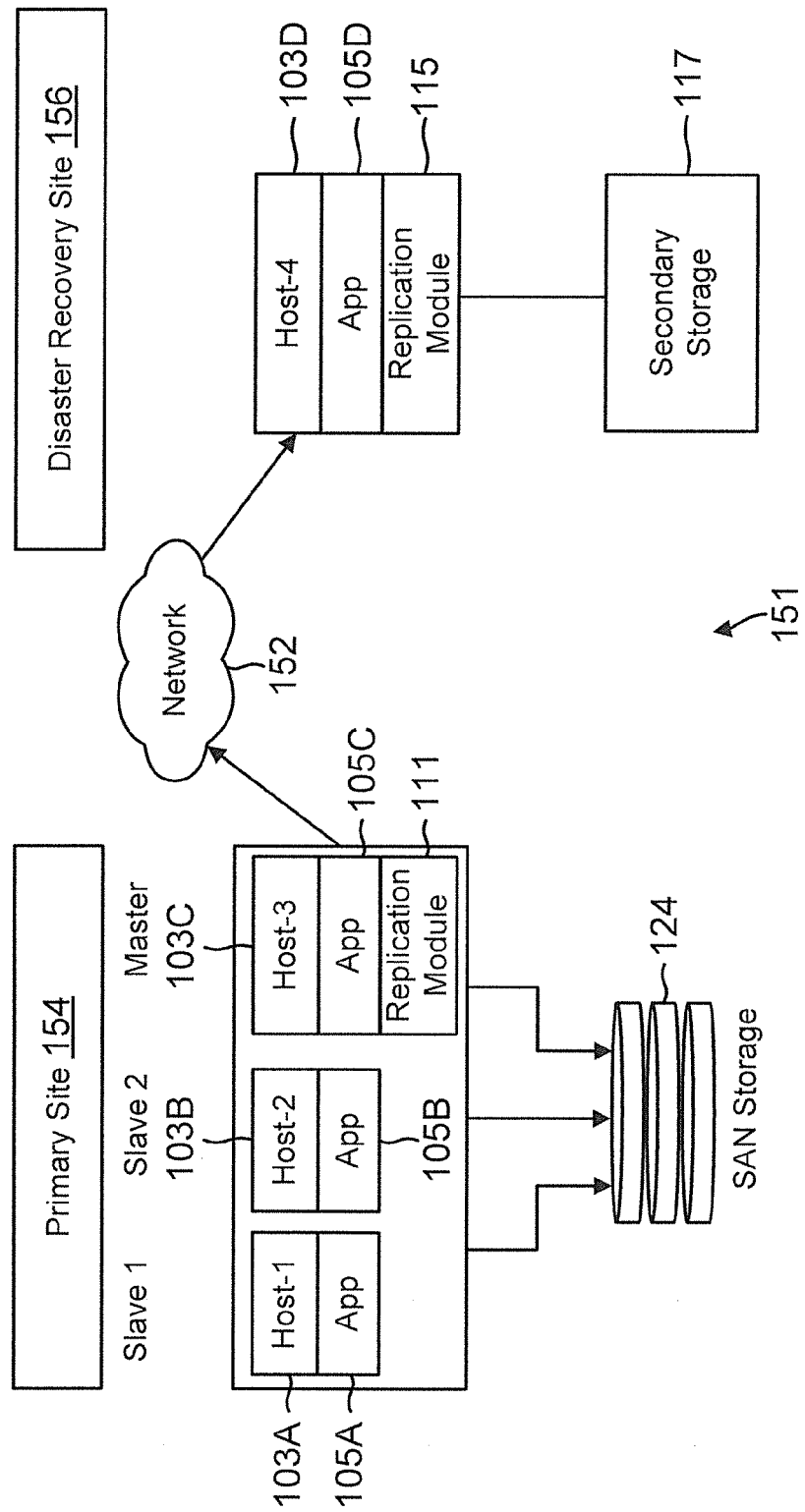
FIG. 1D shows an example of a conventional approach for replication information.

FIG. 1D shows a conventional environment 151 without using ISAs of the present embodiments. Environment 151 includes a primary site having multiple host systems 103A-103C with each host executing an application, for example, 105A-105C but not using ISAs 114B-114D. Some of these applications operate as a slave for example, applications 105A/105B and another application operates as a master, for example, application 105C.

The applications 105A-105B typically send I/O requests to a master host 103C using a TCP/IP network. The master host 103C then splits the I/O s into two segments. A first segment is sent to SAN storage 124, typically using Fibre Channel and the other segment is sent to a disaster receiver (DR) site 156 via network 152 for replication by a replication module 111. The I/O requests sent to DR site 156 are handled by host 103D that executes application 105D and a replication module 115. The replication module 115 may be used to store data at a secondary storage 117. After the SAN and remote replication is completed, the master host 103C sends a status back to the slave applications/hosts.

Briefly, the master host 103C performs the following operations: acquire and release a lock while receiving I/O requests from its own applications and other hosts (103A/103B); splitting the I/O requests for SAN and disaster recovery sites and then replicating the application I/O requests and providing status.

The conventional approach of FIG. 1D has disadvantages. For example, application throughput is low because I/Os from slave hosts are sent using transmission control protocol (TCP)/Internet Protocol (IP), which is slower than Fibre Channel. Also CPU usage at both the master and slave hosts is high. The embodiments disclosed herein provide a better solution than the conventional systems, as described below in detail.

Figure 1E:
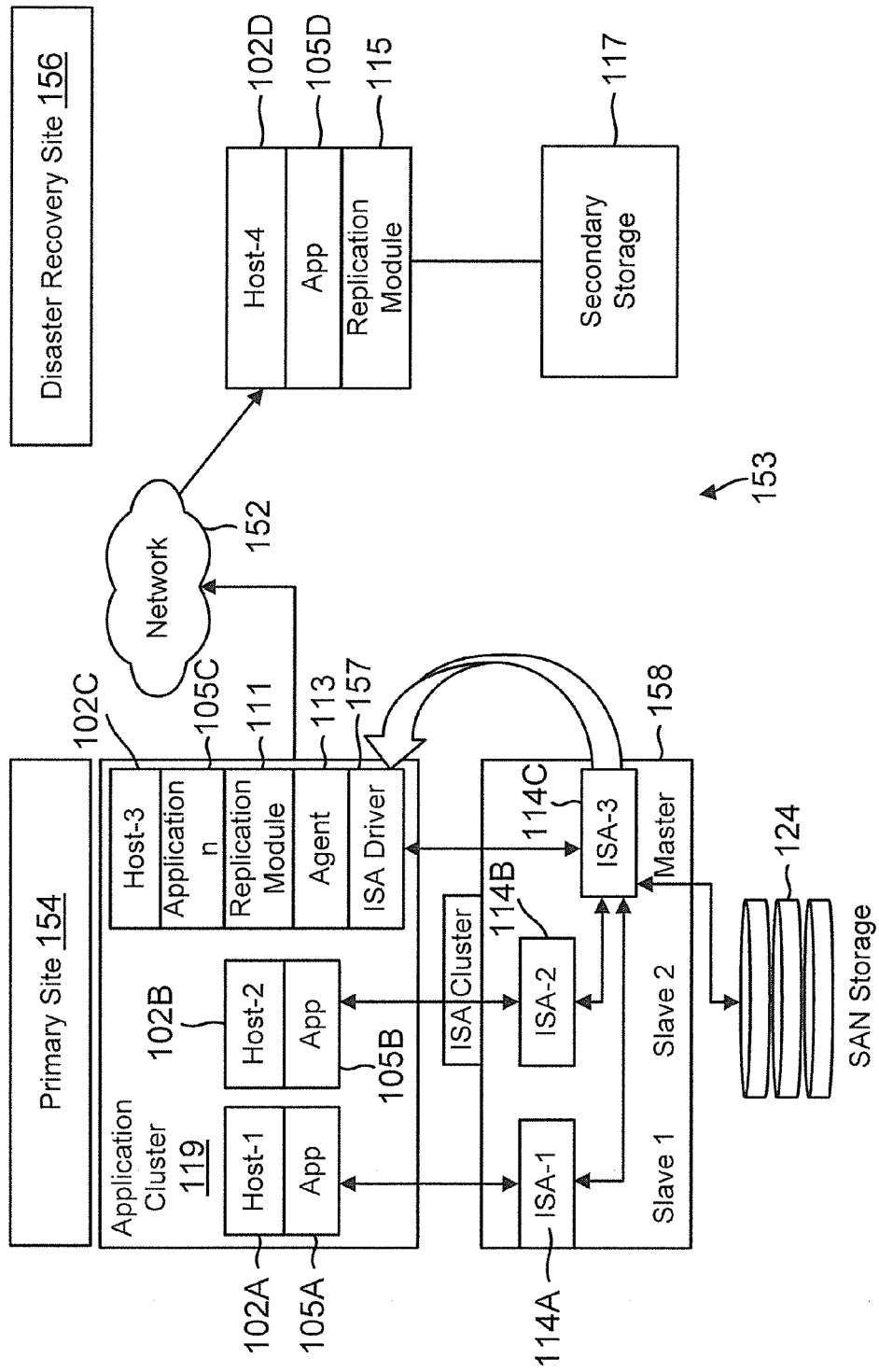
FIG. 1E shows an example of executing replication operations, according to one embodiment.

FIG. 1E shows a modified clustered environment 153 having a plurality of ISAs (114A-111C). The primary site in FIG. 1E has an application cluster with applications 105A-105C and hosts 102A-102C. Host 102C operates as a master and includes an agent 113 that interfaces with an ISA driver 157 executed by the host 102C to interface with ISA 114C. The functions of agent 113 and ISA driver 157 are provided below with respect to FIG. 1F.

As an example, ISA 114C operates as a master, while ISAs 114A-114B operate as slaves. The disaster recovery site 156 operates in a similar manner as shown in FIG. 1D. In one embodiment, the master host tasks are offloaded to ISA 114C and the slave ISAs 114A-114B. The process for using the ISAs of FIG. 1E is provided in FIG. 2 and described below in detail.

Figure 1F:
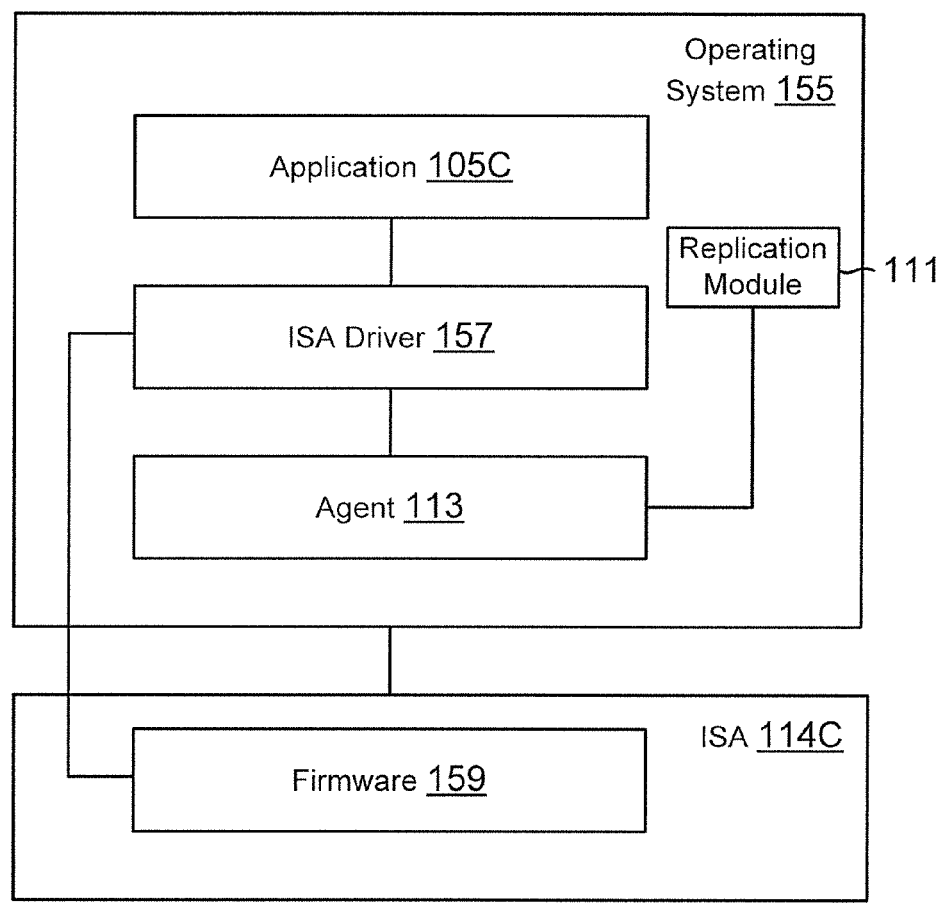
FIG. 1F is an example of a software architecture, used according to one embodiment.

FIG. 1F shows an example of software architecture for using agent 113, according to one embodiment. A host system executes an operating system 155 for controlling the overall operations of the host system 102A. Application 105C interfaces with an ISA driver 157 that is used to communicate with the firmware 159 of ISA 114C, which is used to control the overall operation of ISA 114C.

Agent 113 interfaces with or is a part of ISA driver 157. For synchronous replication, agent 113 operates as a target, for example, a SCSI target. The SCSI target will include a LUN/disk/volume that needs to be replicated. The LUN/disk/volume information is presented by agent 113 to the replication module 111. Replication module 111 then sends I/Os to the disaster recovery site for replication.

Figure 2:
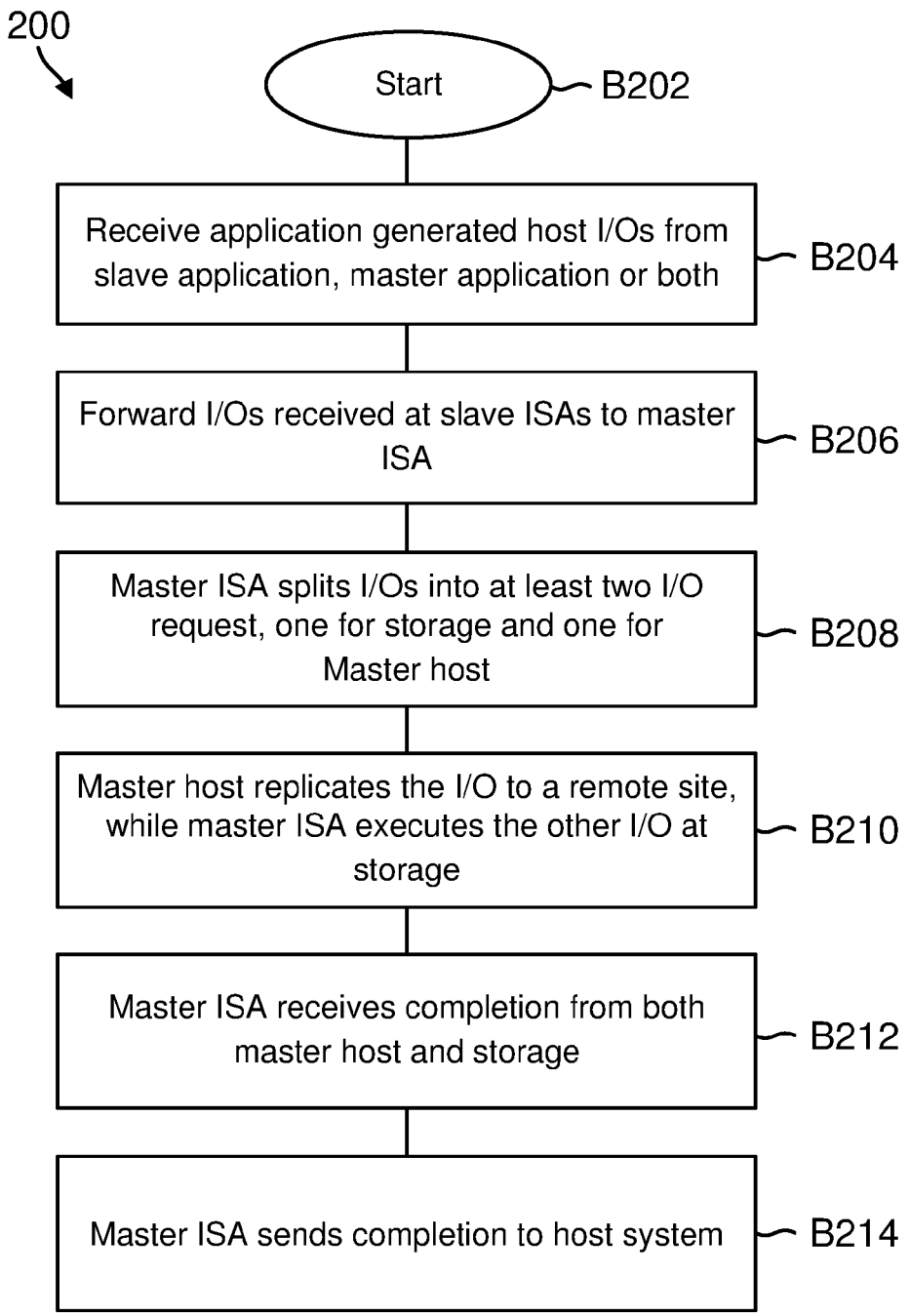
FIG. 2 show a process flow diagram, according to one aspect of the present disclosure.

FIG. 2 shows a process 200 for synchronous replication of write I/Os, according to one embodiment. The process begins in block B202, when hosts 102A-102D are operational and ISAs 114A-114C are initialized.

In block B204, I/Os are generated to write data to a LUN. The I/O are generated by slave applications 105A/105B, master application 105C or both the slave and master applications.

In block B206, the master application I/Os are forwarded directly to ISA 114C, while I/Os from applications 105A-106B are forwarded to ISA 114C via slave ISAs 114A and 114B, respectively. The ISAs 114A/114B may use Fibre Channel to send the I/Os, which is considerably faster than TCP/IP.

In block B208, the master ISA 114C splits the write I/Os into two segments. A first segment is used to write data at the SAN storage 124. The second segment is sent to agent 113 for synchronous replication at the disaster recover site 156.

In block B210, the master host 102C synchronously replicates the I/O to the remote site, while the master ISA 114C executes the other I/O to SAN storage 124.

To replicate the information at the disaster recovery site 156, agent 113 issues an I/O with LUN identifier information, size of the I/O, offset values if any, storage device identifier and any other information. Replication module 111 obtains this information from the I/O and then issues write commands to host 102D. The data is replicated by replication module 115 at the replication site at secondary storage 117.

Once the master ISA 114C receives confirmation that both I/Os are completed, a status is provided to the applications that requested the I/Os in block B214. Thereafter, the process ends.

In one embodiment, the process of FIG. 2 has advantages over conventional systems. For example, the computing effort of sending I/Os by the host slave applications are offloaded to slave ISAs 114A/114B. The co-ordination effort of the master host 102C for coordinating I/Os by the slave applications and itself is also offloaded to the master ISA 114C. Furthermore, the resources for splitting the I/Os is also offloaded to ISA 114C. This saves host computing resources and is more efficient.

Although the present disclosure has been described with reference to specific embodiments, these embodiments are illustrative only and not limiting. For example, although the description above has been described with respect to an ISA, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine implemented method, comprising:
receiving a plurality of write requests at a master intelligent storage adapter communicating with a slave intelligent storage adapter in a cluster;
wherein the master intelligent storage adapter interfaces with a first computing device executing a first application and the slave intelligent adapter interfacing with a second computing device executing a second application: and
wherein one of the plurality of write requests is generated by the first application and provided to the master intelligent storage adapter and another one of the plurality of write requests is generated by the second application and transmitted by the slave intelligent storage adapter to the master intelligent storage adapter;
splitting the plurality of write requests by the master intelligent storage adapter into a first input/out (I/O) request and a second I/O request;
sending the first I/O request by the master intelligent storage adapter to a first storage device accessible via a storage area network (SAN) by a protocol controller of the master intelligent storage adapter; wherein the master intelligent storage adapter accesses the first storage device for writing data associated with the plurality of write requests using the protocol controller and directly manages a local storage device as a cache;
sending the second I/O request by the master intelligent storage adapter to the first computing device that executes an agent that extracts information regarding a logical storage object from the second I/O request; and using the extracted information to generate a write command by the first computing device for a third computing device for replicating the data for the plurality of write requests synchronously at a second storage device while the data is being written at the first storage device by the master intelligent storage adapter.

2. The method of claim 1, wherein the first computing device executes a replication module that generates the write request for the third computing device.

3. The method of claim 1, wherein the first storage device is at a primary storage site and the second storage device is at a disaster recovery site.

4. The method of claim 1, wherein the first storage device is accessed using a Fibre Channel protocol and the second storage device is accessed using a non-Fibre Channel protocol.

5. The method of claim 1, wherein the third computing device executes a replication module for replicating the data at the second storage device.

6. The method of claim 1, wherein the master intelligent storage adapter receives completion of writing the data both at the first storage device and the second storage device.

7. The method of claim 6, wherein the master intelligent storage adapter sends a completion to both the first and second computing devices after the data has been written to the first storage device and the second storage device.

8. A non-transitory, machine readable storage medium having stored thereon instructions comprising machine executable code which when executed by at least one machine, causes the machine to:

receive a plurality of write requests at a master intelligent storage adapter communicating with a slave intelligent storage adapter in a cluster;

wherein the master intelligent storage adapter interfaces with a first computing device executing a first application and the slave intelligent adapter interfacing with a second computing device executing a second application; and wherein one of the plurality of write requests is generated by the first application and provided to the master intelligent storage adapter and another one of the plurality of write requests is generated by the second application and transmitted by the slave intelligent storage adapter to the master intelligent storage adapter;

split the plurality of write requests by the master intelligent storage adapter into a first input/out (I/O) request and a second I/O request;

send the first I/O request by the master intelligent storage adapter to a first storage device accessible via a storage area network (SAN) by a protocol controller of the master intelligent storage adapter; wherein the master intelligent storage adapter accesses the first storage device for writing data associated with the plurality of write requests using the protocol controller and directly manages a local storage device as a cache;

send the second I/O request by the master intelligent storage adapter to the first computing device that executes an agent that extracts information regarding a logical storage object from the second I/O request; and use the extracted information to generate a write command by the first computing device for a third computing device for replicating the data for the plurality of write requests synchronously at a second storage device while the data is being written at the first storage device by the master intelligent storage adapter.

9. The storage medium of claim 8, wherein the first computing device executes a replication module that generates the write request for the third computing device.

10. The storage medium of claim 8, wherein the first storage device is at a primary storage site and the second storage device is at a disaster recovery site.

11. The storage medium of claim 8, wherein the first storage device is accessed using a Fibre Channel protocol and the second storage device is accessed using a non-Fibre Channel protocol.

12. The storage medium of claim 8, wherein the third computing device executes a replication module for replicating the data at the second storage device.

13. The storage medium of claim 8, wherein the master intelligent storage adapter receives completion of writing the data both at the first storage device and the second storage device.

14. The storage medium of claim 13, wherein the master intelligent storage adapter sends a completion to both the first and second computing devices after the data has been written to the first storage device and the second storage device.

15. A system, comprising:

a master intelligent storage adapter operating within a cluster having a slave intelligent storage adapter receives a plurality of write requests;

wherein the master intelligent storage adapter interfaces with a first computing device executing a first application and the slave intelligent adapter interfaces with a second computing device executing a second application;

wherein one of the plurality of write requests is generated by the first application and provided to the master intelligent storage adapter and another one of the plurality of write requests is generated by the second application and transmitted by the slave intelligent storage adapter to the master intelligent storage adapter;

wherein the master intelligent storage adapter splits the plurality of write requests into a first input/out (I/O) request and a second request, sends the first I/O request to a first storage device accessible via a storage area network (SAN) by a protocol controller of the master intelligent storage adapter and sends the second I/O request to the first computing device that executes an agent that extracts information regarding a logical storage object from the second I/O request; and wherein the first computing device uses the extracted information to generate a write command for a third computing device for replicating the data for the plurality of write requests synchronously at a second storage device while the data is being written at the first storage device by the master intelligent storage adapter that also manages a local storage device as a cache.

16. The system of claim 15, wherein the first computing device executes a replication module that generates the write request for the third computing device.

17. The system of claim 15, wherein the first storage device is at a primary storage site and the second storage device is at a disaster recovery site.

18. The system of claim 15, wherein the first storage device is accessed using a Fibre Channel protocol and the second storage device is accessed using a non-Fibre Channel protocol.

19. The system of claim 15, wherein the third computing device executes a replication module for replicating the data at the second storage device.

20. The system of claim 15, wherein the master intelligent storage adapter receives completion of writing the data both at the first storage device and the second storage device.

21. The system of claim 20, wherein the master intelligent storage adapter sends a completion to both the first and second computing devices after the data has been written to the first storage device and the second storage device.

* * * * *

UNITED STATES PATENT AND TRADEMARK OFFICE
CERTIFICATE OF CORRECTION

PATENT NO. : 9,477,424 B1  
APPLICATION NO. : 14/339086  
DATED : October 25, 2016  
INVENTOR(S) : Verma Page 1 of 1

It is certified that error appears in the above-identified patent and that said Letters Patent is hereby corrected as shown below:

In the Claims

Column 10, Line 56, Claim 1, delete "input/out" and insert -- input/output --, therefor.

Column 11, Line 50, Claim 8, delete "input/out" and insert -- input/output --, therefor.

Column 12, Line 43, Claim 15, delete "input/out" and insert -- input/output --, therefor.

Column 12, Line 44, Claim 15, after "second" insert -- I/O --, therefor.

Signed and Sealed this  
Twenty-eighth Day of February, 2017

Michelle K. Lee  
*Director of the United States Patent and Trademark Office*